US008467184B2

United States Patent
Chen et al.

(10) Patent No.: US 8,467,184 B2
(45) Date of Patent: Jun. 18, 2013

(54) PORTABLE ELECTRICAL DEVICE

(75) Inventors: Gwo-Chyuan Chen, Taipei (TW); Chang-Ta Miao, Taipei (TW)

(73) Assignee: Quanta Corporation, Taoyuan Shien (TW)

( * ) Notice: Subject to any disclaimer, the term of this patent is extended or adjusted under 35 U.S.C. 154(b) by 208 days.

(21) Appl. No.: 13/193,726

(22) Filed: Jul. 29, 2011

(65) Prior Publication Data
US 2012/0229962 A1 Sep. 13, 2012

(30) Foreign Application Priority Data
Mar. 11, 2011 (TW) .............................. 100108337 A

(51) Int. Cl.
G06F 1/16 (2006.01)
H05K 5/00 (2006.01)
H05K 7/00 (2006.01)

(52) U.S. Cl.
USPC .................................................. 361/679.55

(58) Field of Classification Search
None
See application file for complete search history.

(56) References Cited

U.S. PATENT DOCUMENTS

| | | | | |
|---|---|---|---|---|
| 5,267,123 A * | 11/1993 | Boothroyd et al. | ...... | 361/679.09 |
| 6,056,248 A * | 5/2000 | Ma | .............. | 248/124.1 |
| 6,249,431 B1 * | 6/2001 | Chan | ........................ | 361/679.27 |
| 6,430,038 B1 * | 8/2002 | Helot et al. | .............. | 361/679.05 |
| 6,464,195 B1 * | 10/2002 | Hildebrandt | .................. | 248/460 |
| 6,532,147 B1 * | 3/2003 | Christ, Jr. | .................. | 361/679.27 |
| 6,975,507 B2 * | 12/2005 | Wang et al. | .............. | 361/679.21 |
| 6,980,423 B2 * | 12/2005 | Tanaka et al. | ............ | 361/679.06 |
| 7,184,262 B2 * | 2/2007 | Hsu et al. | .................. | 361/679.27 |
| 7,203,058 B2 * | 4/2007 | Hong | ........................ | 361/679.06 |
| 7,239,505 B2 * | 7/2007 | Keely et al. | .............. | 361/679.09 |
| 7,251,128 B2 * | 7/2007 | Williams et al. | ......... | 361/679.55 |
| 7,430,111 B2 * | 9/2008 | Lee et al. | .................. | 361/679.27 |
| 7,444,716 B2 * | 11/2008 | Hsu | ................ | 16/366 |
| 7,652,873 B2 * | 1/2010 | Lee | ........................ | 361/679.06 |
| 7,669,287 B2 * | 3/2010 | Lee et al. | ........................ | 16/340 |
| 7,819,368 B2 * | 10/2010 | Jung et al. | ..................... | 248/133 |
| 7,911,784 B2 * | 3/2011 | Jones | ........................ | 361/679.55 |
| 2003/0142474 A1 * | 7/2003 | Karidis et al. | ................ | 361/683 |
| 2004/0114315 A1 * | 6/2004 | Anlauff | ......................... | 361/681 |
| 2005/0052834 A1 * | 3/2005 | Tanaka et al. | .................. | 361/681 |
| 2005/0128695 A1 * | 6/2005 | Han | ............................ | 361/683 |
| 2005/0206615 A1 * | 9/2005 | Tanimoto et al. | ............ | 345/156 |
| 2005/0254203 A1 * | 11/2005 | Choi et al. | ..................... | 361/681 |
| 2006/0039104 A1 * | 2/2006 | Wang et al. | .................. | 361/681 |
| 2006/0113445 A1 * | 6/2006 | Parsons | ....................... | 248/276.1 |
| 2006/0152894 A1 * | 7/2006 | Moengen | ....................... | 361/681 |
| 2006/0274490 A1 * | 12/2006 | Cheng | ........................ | 361/683 |
| 2008/0034550 A1 * | 2/2008 | Chang et al. | .................... | 16/367 |
| 2008/0094792 A1 * | 4/2008 | Chen et al. | .................... | 361/681 |
| 2008/0304217 A1 * | 12/2008 | Lai et al. | ....................... | 361/681 |
| 2009/0008518 A1 * | 1/2009 | Shen | ......................... | 248/122.1 |
| 2009/0147458 A1 * | 6/2009 | Wang et al. | .............. | 361/679.27 |
| 2009/0231796 A1 * | 9/2009 | Hung | ....................... | 361/679.27 |

\* cited by examiner

Primary Examiner — Hoa C Nguyen
Assistant Examiner — Xanthia C Cunningham
(74) Attorney, Agent, or Firm — Rabin & Berdo, P.C.

(57) ABSTRACT

A portable electrical device includes an upper unit, a lower unit and a connection unit having a first end and a second end opposite with each other. The upper unit is pivoted on the first end of the connection unit with a first pivotal portion having a first elastic member. The lower unit is pivoted on the second end of the connection unit with a second pivotal portion having a second elastic member. Therefore, by releasing the first elastic member and the second elastic member, the connection unit is rotated to leave the lower unit, and the upper unit is rotated to contact with the lower unit.

10 Claims, 10 Drawing Sheets

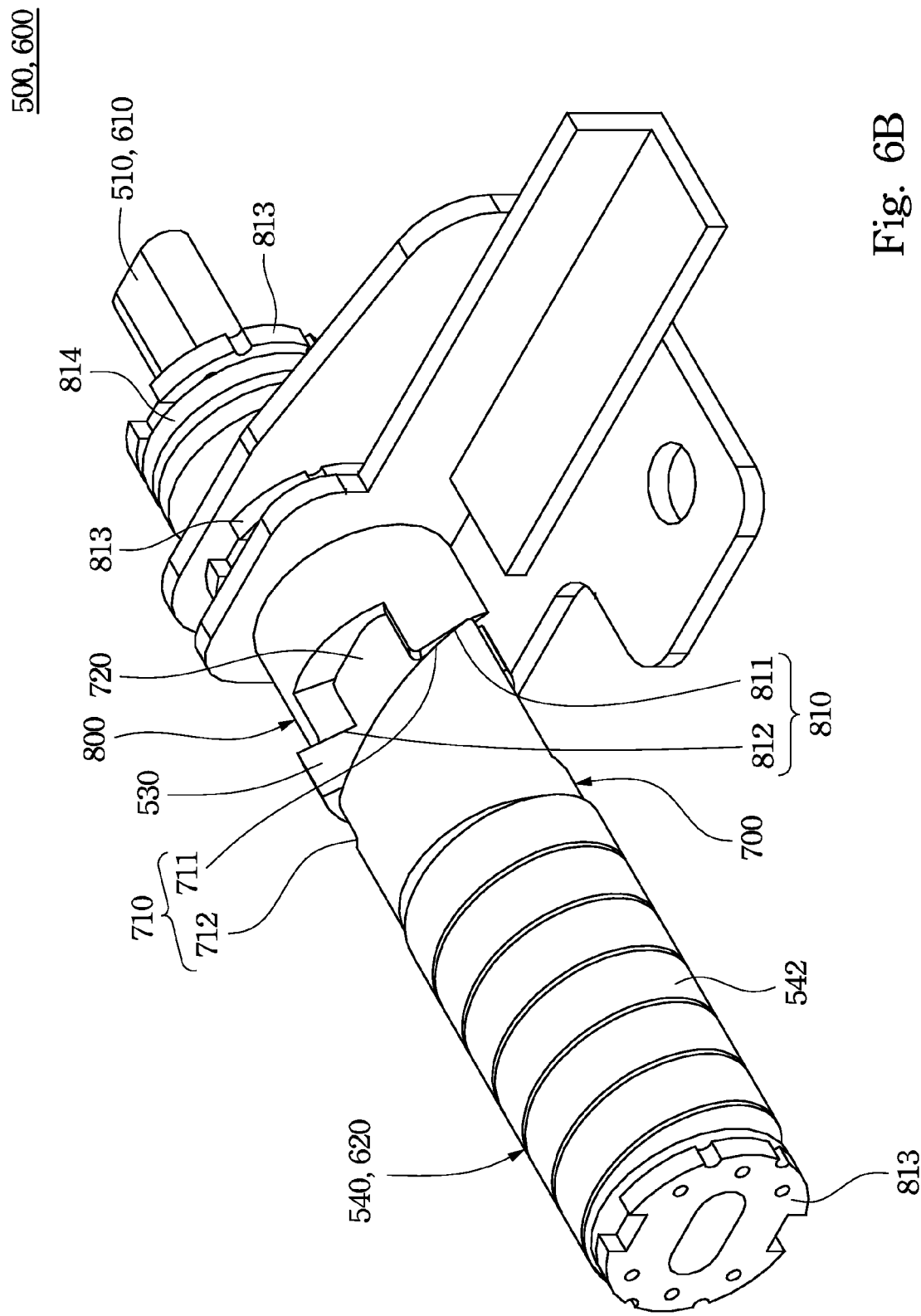

PORTABLE ELECTRICAL DEVICE

RELATED APPLICATIONS

This application claims priority to Taiwanese Application Serial Number 100108337, filed Mar. 11, 2011, which is herein incorporated by reference.

BACKGROUND

1. Technical Field

The present invention relates to a portable electrical device, more particular to a portable electrical device capable of automatically opening itself to reveal a keyboard interface.

2. Description of Related Art

Since the appearance of a present portable electrical device is still designed according to tendencies of small, compact, and easy-to-carry, a user can be facilitated to carry the present portable electrical device while moving.

For an example of a traditional tablet PC having compact and easy-to-carry properties, the traditional tablet PC may provide users to handwrite and input information on a screen thereof. However, since the tablet PC is not configured with a physical keyboard, thus, it is uncomfortable for a user who is used to input information by operating a physical keyboard so that the user cannot input information smoothly and naturally, and needs to buy another compatible physical keyboard to cooperate with the traditional tablet PC. However, it might be inconvenient to carry both the traditional tablet PC and the compatible physical keyboard together. Thus, it might decrease the user's motivation and desirability to purchase of the traditional tablet PC, therefore, the traditional tablet PC needs to be further improved.

Consequently, how to provide a portable electrical device not only meet both of the mentioned needs which are conflicted with each other, or at least provide a solution of the user meeting the mentioned needs, that is, to keep the advantages of the traditional tablet PC, but still with a physical keyboard thereon so as to make the industries to win from all of the competitors, shall be concerned as one of serious studying issues.

SUMMARY

The present invention is to disclose a portable electric device, in an embodiment thereof, when the portable electric device is a notebook computer, a display screen of the notebook computer can be covered on a physical keyboard of the notebook computer in a closed status so as to provide a reading mode of the notebook computer, on the contrary, the display screen of the notebook computer can be raised automatically and reveal the physical keyboard of the notebook computer in an open status so as to resume the normal mode of the notebook computer.

The present invention is to disclose a portable electric device, in another embodiment thereof, when the portable electric device is a tablet PC, the tablet PC can be raised automatically in an open status to reveal a co-operational physical keyboard thereof so as to provide a combination style of the tablet PC and a physical keyboard.

One practice of the present invention is to provide a portable electric device. The portable electric device comprises an upper unit, a lower unit, a connection unit, a first pivotal portion and a second pivotal portion. The connection unit is with a first end and a second end opposite with each other. The first pivotal portion comprises a first pivot and a first elastic member. The first pivot is served for pivoting the upper unit on the first end of the connection unit. The first elastic member is disposed on the first pivot. The second pivotal portion comprises a second pivot and a second elastic member. The second pivot is served for pivoting the lower unit on the second end of the connection unit. The second elastic member is disposed on the second pivot. Thus, when the upper unit, the connection unit and the lower unit are stacked together in parallel by an external force, the first elastic member and the second elastic member are respectively deformed to store a restored force. On the other hand, when the external force is gone, the restored force of the second elastic member rotates the connection unit to be away from the lower unit so as to retain a second included angle between the lower unit and the connection unit, and the restored force of the first elastic member rotates the upper unit to contact with the lower unit so as to retain a first included angle between the upper unit and the connection unit, meanwhile, a third included angle is retained between the upper unit and the lower unit.

To sum up, by releasing the first elastic member and the second elastic member, the portable electric device of the present invention allows the upper unit automatically raising upwards the lower unit without operating manually by a user, thus, the present invention not only increases the convenience for using the portable electric device, but also enhances desirability of users for purchasing and utilizing the portable electric device.

BRIEF DESCRIPTION OF THE DRAWINGS

The present invention will be apparent to those skilled in the art by reading the following detailed description of a preferred embodiment thereof, with reference to the attached drawings, in which:

FIG. 6B is a back partial view of the pivotal portions and the elastic members of the portable electric device according to the further embodiment of the present invention.

DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
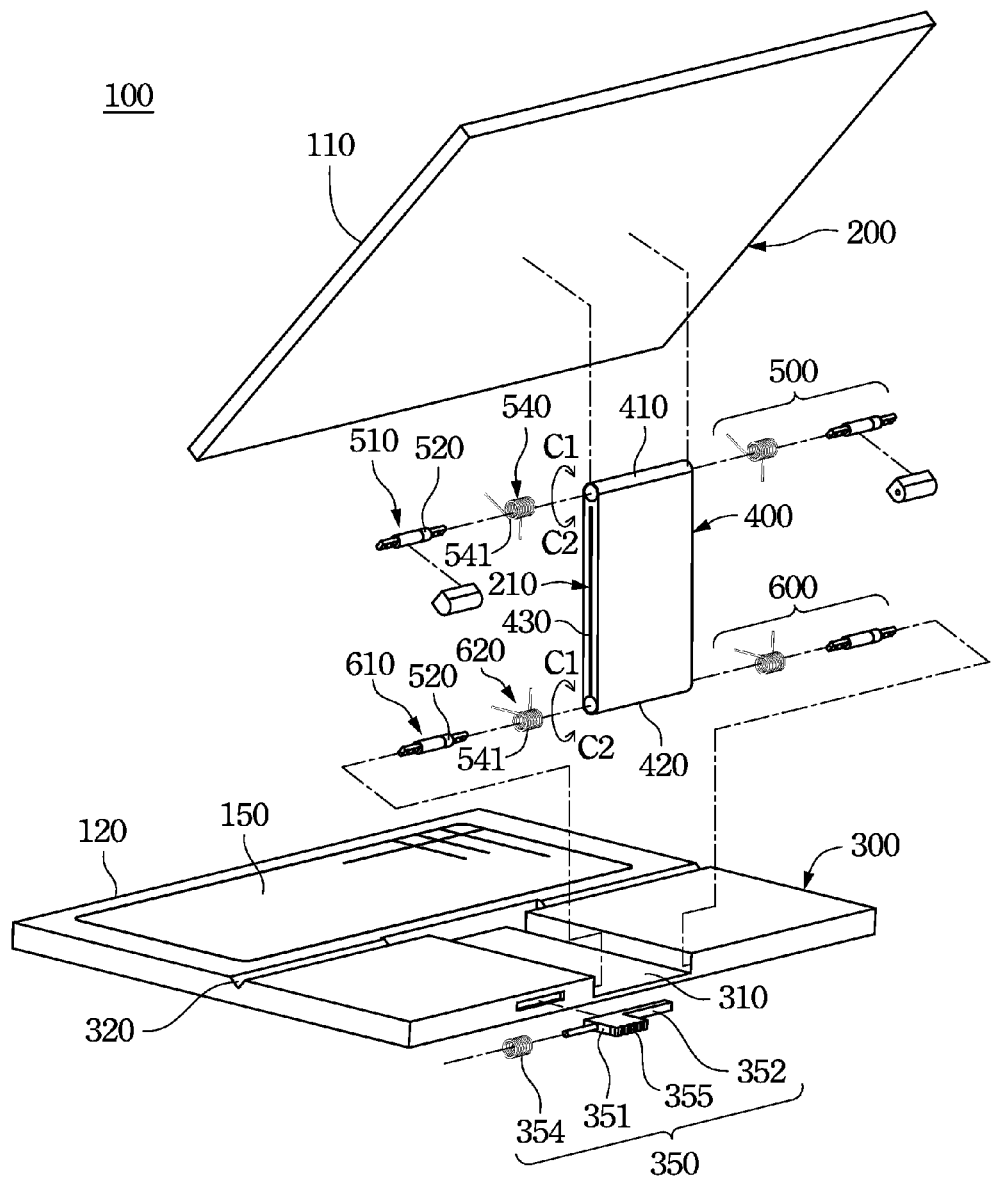
FIG. 1 is an exploded view of a portable electric device according to a embodiment of the present invention.

Refer to FIG. 1 in which FIG. 1 is an exploded view of a portable electric device 100 according to an embodiment of the present invention.

In a practice of the present invention, the portable electric device 100 at least includes an upper unit 200, a lower unit 300, a connection unit 400, two first pivotal portions 500, and two second pivotal portions 600. The connection unit 400, for example, is presented as flat, and the connection unit 400 includes a first end 410 and a second end 420 opposite with each other. The lower unit 300 includes a containing recess 310. The containing recess 310 is disposed on a surface of the lower unit 300, and aligned with the connection unit 400, for containing the connection unit 400. Each of the first pivotal portions 500 includes a first pivot 510 and a first elastic member 540. By the first pivots 510, the first pivotal portions 500 pivot the upper unit 200 on the first end 410 of the connection unit 400, so that the upper unit 200 can revolve relative to the first end 410 of the connection unit 400. Each of the second pivotal portions 600, set in the containing recess 310, includes a second pivot 610 and a second elastic member 620. By the second pivots 610, the second pivotal portions 600 pivot the lower unit 300 on the second end 420 of the connection unit 400, so that the second end 420 of the connection unit 400 can revolve relative to the lower unit 300.

In the embodiment, each of the first elastic members 540, for example, is a torsion spring 541 set on one of the first pivots 510 in which two ends of the torsion spring 541 are respectively connected the upper unit 200 and the first end 410 of the connection unit 400. Each of the second elastic members 620, for example, is a torsion spring 541 set on one of the second pivots 610 in which two ends of the torsion spring 541 are respectively connected the lower unit 300 and the second end 420 of the connection unit 400.

Figure 2A:
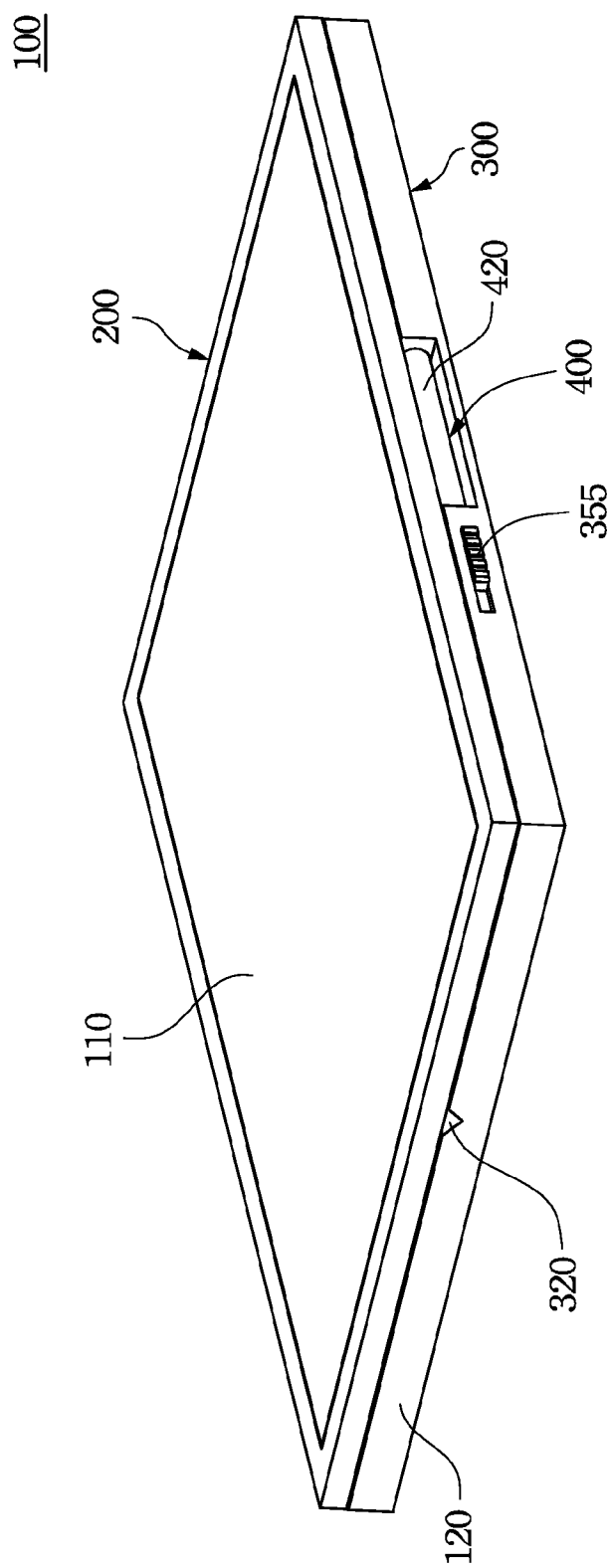
FIG. 2A is a schematic view of the portable electric device of FIG. 1 in a closed status.
Figure 2B:
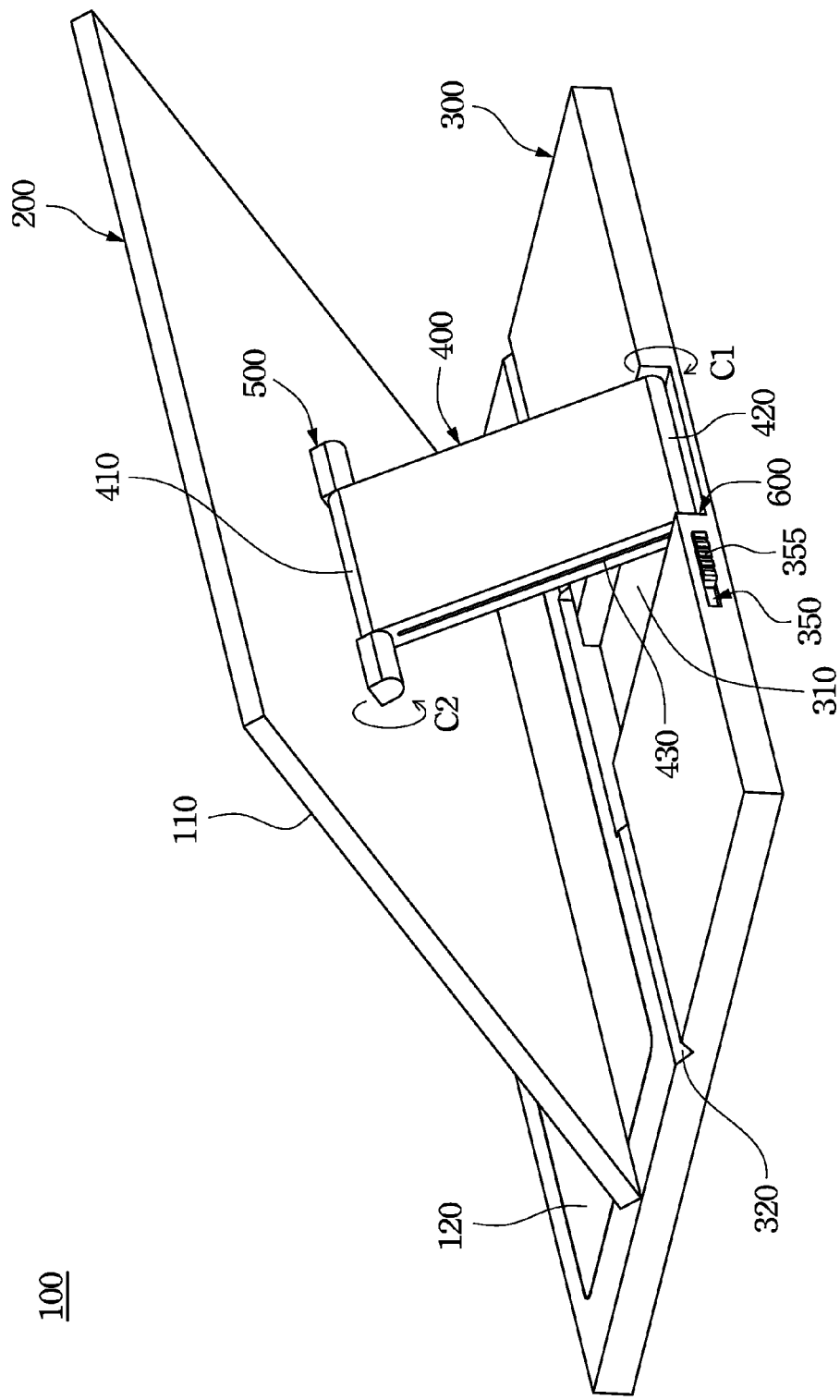
FIG. 2B is a schematic view of the portable electric device of FIG. 1 being operated into enter an open status.

Thus, refer to FIG. 2A and FIG. 2B, in which FIG. 2A is a schematic view of the portable electric device of FIG. 1 in a closed status, FIG. 2B is a schematic view of the portable electric device of FIG. 1 being operated into enter an open status.

When a user exerts an external force on the upper unit 200 in the open status, the upper unit 200 revolves relative to the connection unit 400 according to a first clockwise direction C1, meanwhile, the first end 410 of the connection unit 400 revolves according to a second clockwise direction C2, the second clockwise direction C2 is totally reverse to the first clockwise direction C1, consequentially, the second end 420 of the connection unit 400 is revolved relative to the lower unit 300 by the second pivotal portions 600 according to the second clockwise direction C2. Thus, the upper unit 200, the connection unit 400, and the lower unit 300 are stacked together in parallel, and the connection unit 400 is hidden in the containing recess 310 (as shown in FIG. 1, hereinafter called as a closed status), also, the first elastic members 540 and the second elastic members 620 are respectively deformed to store a force for restoring, respectively.

Furthermore, the connection unit 400 (shown as FIG. 1) or the upper unit 200 is equipped with a first stop portion 210. The lower unit 300 is equipped with a second stop portion 350. When the portable electric device 100 is in the closed status, the first stop portion 210 can be engaged with the second stop portion 350 so as to keep the portable electric device 100 staying in the closed status.

Figure 2C:
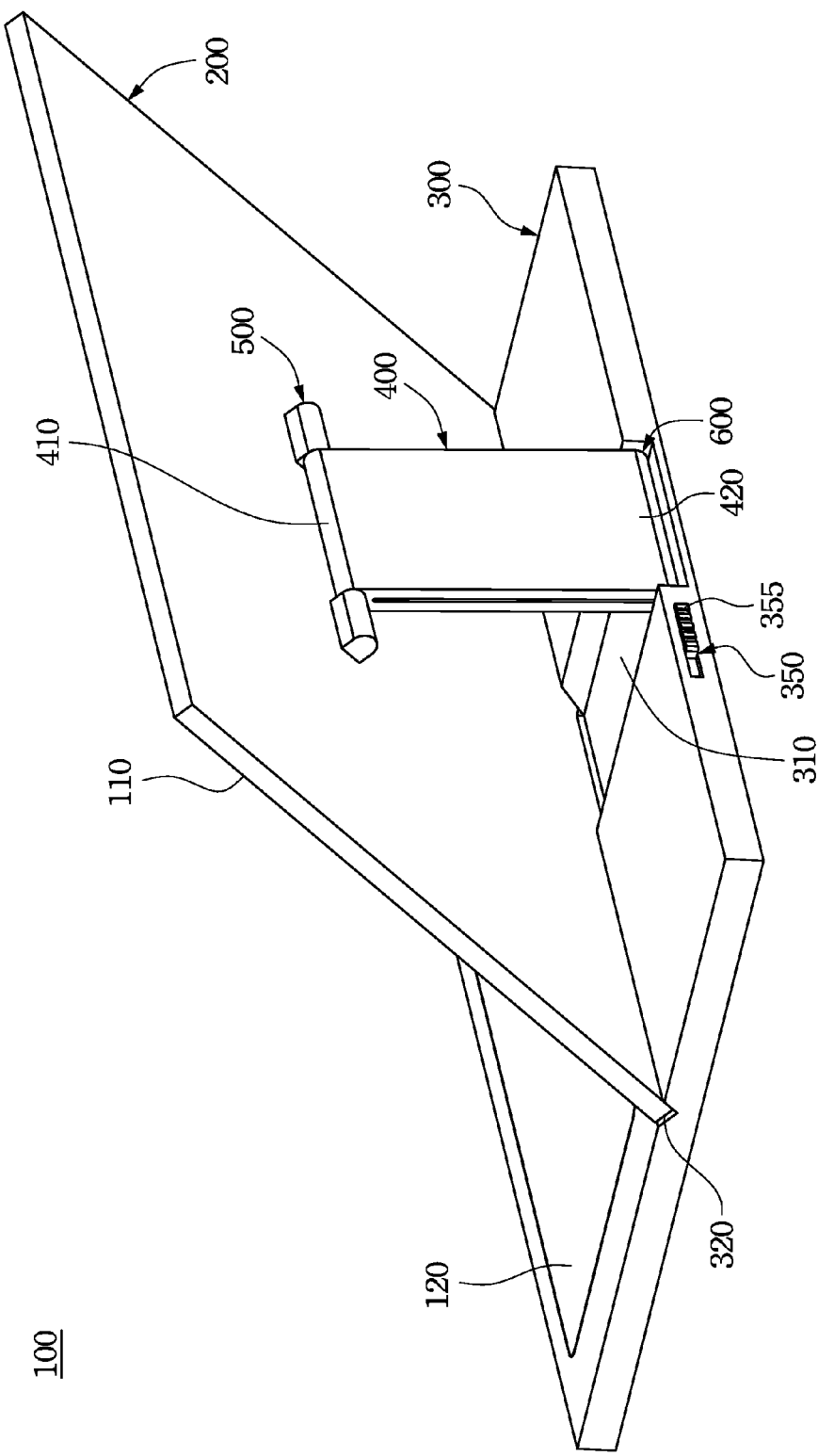
FIG. 2C is a schematic view of the portable electric device of FIG. 1 in the open status.

Otherwise, refer to FIG. 2C in which FIG. 2C is a schematic view of the portable electric device 100 of FIG. 1 in the open status.

When the second stop portion 350 is disengaged from the first stop portion 210, each restored force of the second elastic members 620 drives the second end 420 of the connection unit 400 to revolve relative to the lower unit 300 with the second pivotal portion 600 according to the first clockwise direction C1 so that the first end 410 of the connection unit 400 is being away from the lower unit 300, meanwhile, each restored force of the first elastic members 540 drives the upper unit 200 to revolve relative to the connection unit 400 with the first pivotal portion 500 according to the second clockwise direction C2, so that the lower edge of the upper unit 200 approaches the lower unit 300 (shown as FIG. 2B) until each restored force of the first elastic members 540 is in force balance with the weight of the upper unit 200. Further, each restored force of the first elastic members 540 even does not need to be in force balance with the weight of the upper unit 200, as long as the upper unit 200 is contacted with the lower unit 300, or even, abutted by the lower unit 300 so as to let the upper unit 200 fail to revolve relative to the connection unit 400 according to the second clockwise direction C2 (as shown in FIG. 2C, hereinafter called as an open status)

In one option of the present invention, each restored force of the first elastic members 540 is less than each restored force of the second elastic members 620 so as to ensure that the second pivotal portions 600 lifts the connection unit 400 upwardly before the first pivotal portions 500 revolves the upper unit 200 towards the lower unit 300.

Figure 2D:
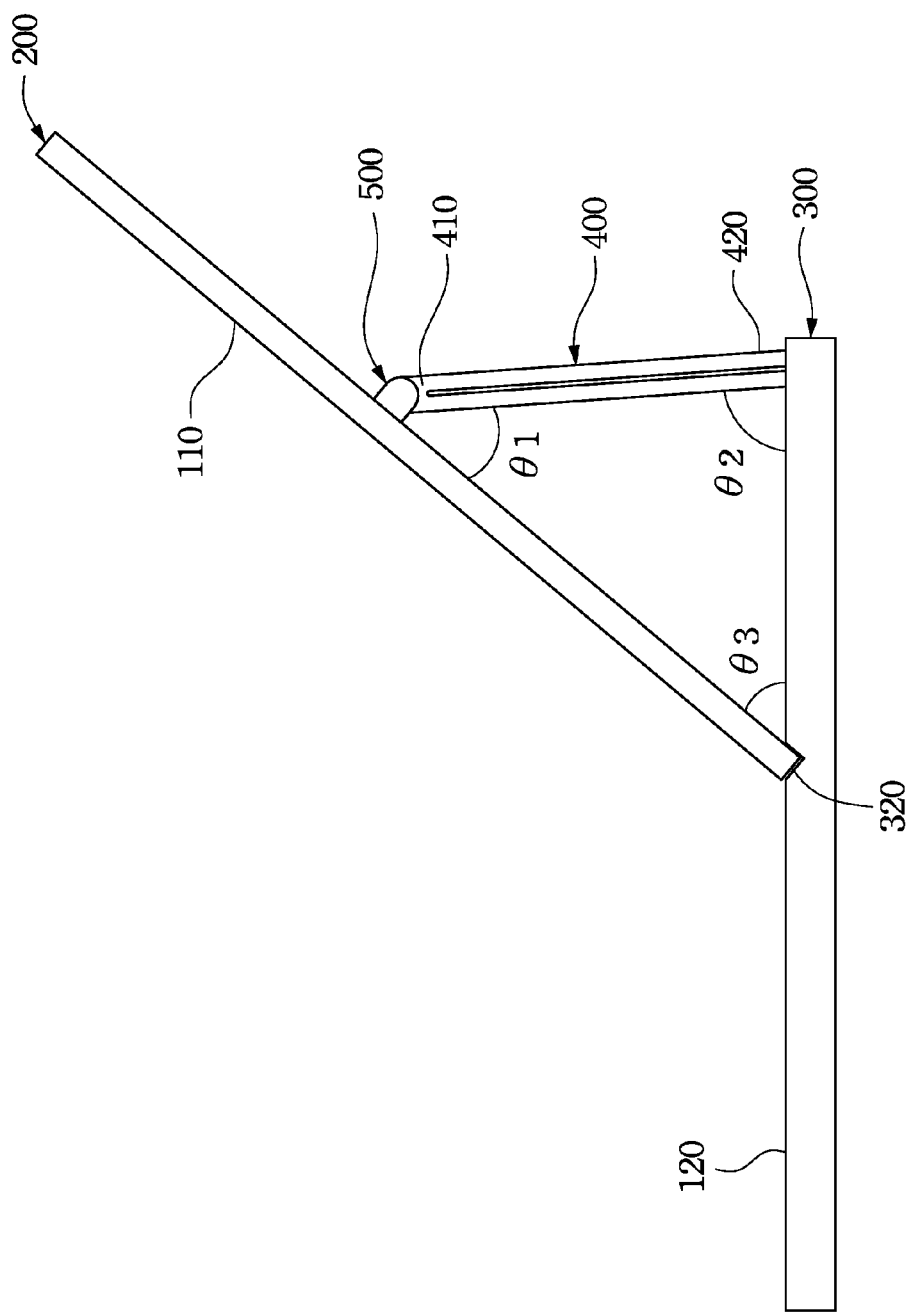
FIG. 2D is a side view of the portable electric device of FIG. 2C.

Refer to FIG. 2C and FIG. 2D in which FIG. 2D is a side view of the portable electric device 100 of FIG. 2C.

When the portable electric device 100 is operated into the open status, each of the first elastic members 540 makes a first included angle θ1 retained between the upper unit 200 and the connection unit 400. each of the second elastic members 620 makes a second included angle θ2 (between 0-90 degree or 90 degree) retained between the lower unit 300 and the connection unit 400. Meanwhile, a third included angle θ3 is retained between the upper unit 200 and the lower unit 300, that is, the upper unit 200 is inclinedly disposed on the lower unit 300, and can be supported by both the lower unit 300 and the connection unit 400.

Refer to FIG. 1 and FIG. 2D again. In another option of the present invention, a surface of the lower unit 300 being contacted with the upper unit 200 has a trench 320 substantially same as the upper unit 200 in length. When the portable electric device 100 is operated into the open status, and the upper unit 200 revolves relative to the connection unit 400 according to the second clockwise direction C2, the lateral side of the upper unit 300 can be leant or abutted against by the trench 320 so as to stop the upper unit 300 keep revolving according to the second clockwise direction C2.

Figure 3:
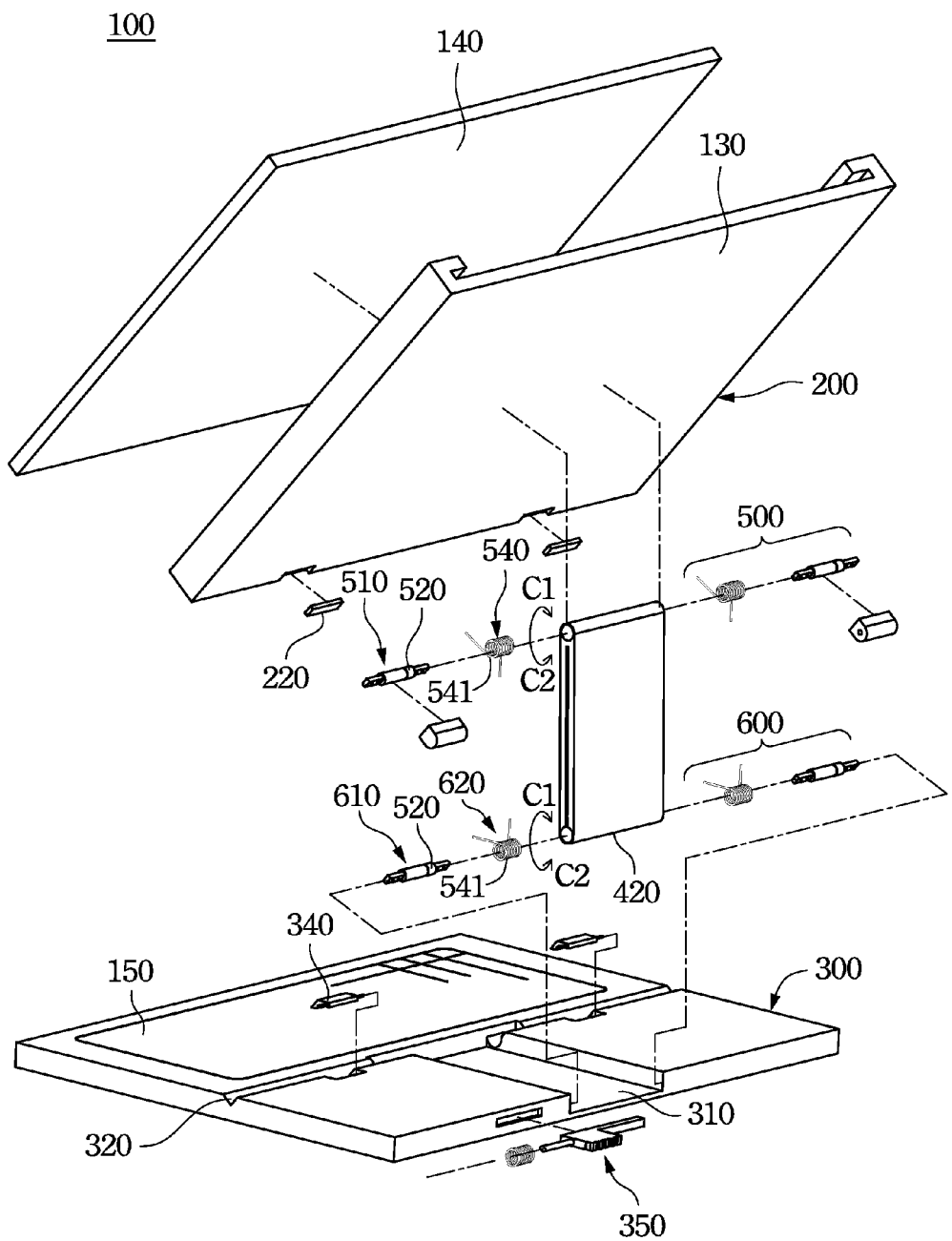
FIG. 3 is an exploded view of a portable electric device according to another embodiment of the present invention.
Figure 4:
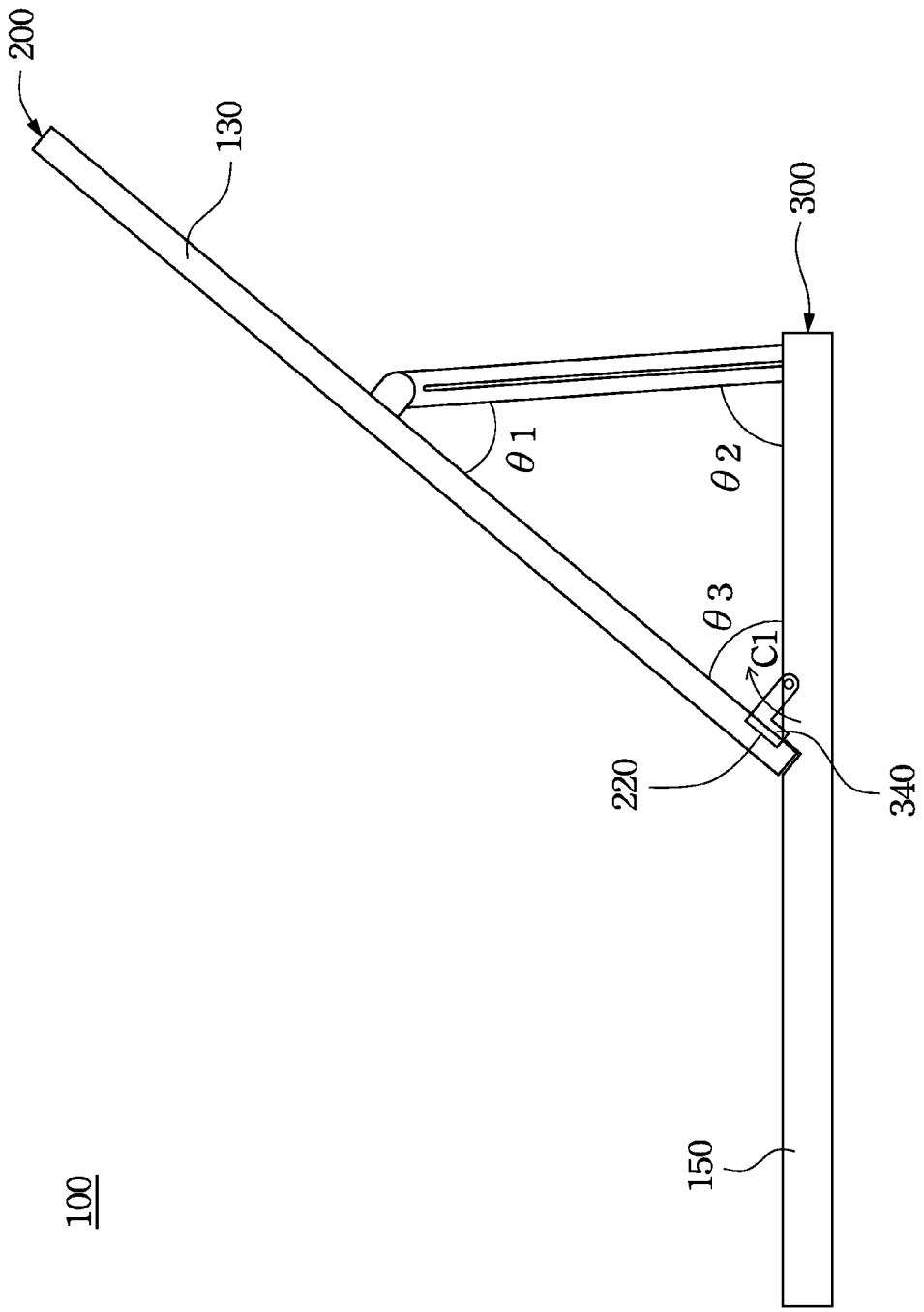
FIG. 4 is a side view of the portable electric device of FIG. 3 in an open status.

Refer to FIG. 3 and FIG. 4 in which FIG. 3 is an exploded view of a portable electric device 100 according to another embodiment of the present invention; FIG. 4 is a side view of the portable electric device 100 of FIG. 3 in an open status.

An edge of the upper unit 200 contacting to the upper unit 300 is embedded with at least one first magnetism suction member 220. The surface of the lower unit 300 is installed with at least one second magnetism suction member 340 corresponding to the first magnetism suction member 220, specifically, the second magnetism suction member 340 is pivoted on a surface of the lower unit 300 capable of being contacted by the upper unit 200. Thus, when the portable electric device 100 is operated into the open status as mentioned above, and the upper unit 200 revolves relative to the connection unit 400 according to the second clockwise direction C2, once the first magnetism suction member 220 of the upper unit 200 approaches the second magnetism suction member 340 of the lower unit 300, due to magnetic effect of the first magnetism suction member 220 and the second magnetism suction member 340, the second magnetism suction member 340 will revolve according to the first clockwise direction C1 to attract the first magnetism suction member 220 with each other so as to stop effectively the upper unit 200 keeping revolution.

To be noticed, the first magnetism suction member 220 and the second magnetism suction member 340 can be the combination of a metal and a magnet, or the first magnetism suction member 220 and the second magnetism suction member 340 are both magnets. Furthermore, the trench 320 might not be needed to install in the embodiment, however, when the trench 320 is installed on the surface of the lower unit 300, the trench 320 helps to stop effectively the upper unit 200 keeping revolution and to stay the portable electric device 100 in the open status.

Also, as long as the upper unit 200 is effectively stopped to revolving, the second magnetism suction member 340 does not have to be pivoted on the surface of the lower unit 300. The purpose that the second magnetism suction member 340 is pivoted on the surface of the lower unit 300 is that the second magnetism suction member 340 can be hidden inside the lower unit 300 while operated into the closed status, so that the second magnetism suction member 340 will not obstruct the upper unit 200 to move or provides a good appearance of a flat surface thereof.

Refer to FIG. 1 and FIG. 2A again. In one option of the embodiment, the first stop portion 210 disposed on one lateral side of the connection unit 400 can be presented as a groove thereon, for example; the second stop portion 350 disposed inside the lower unit 300 includes a tenon 351, a restoring elastic member 354, and an operation portion 355. The restoring elastic member 354 is fixed in the lower unit 300 with one end thereof, and is connected to the tenon 351 with the other end thereof, so that the tenon 351 is retractably disposed in the lower unit 300. One side of the operation portion 355 is disposed on one side of the tenon 351, and the operation portion 355 is revealed outwards an outer surface of the lower unit 300 for operating by users. A projection 352 is on the other end of the tenon 351 opposite to the restoring elastic member 354, and the projection 352 can extend from inside of the lower unit 300 outwards the containing recess 310 for inserting into the groove 430.

Therefore, when the portable electric device 100 is operated into the closed status as mentioned above, and the connection unit 400 is contained in the containing recess 310, due to a restored force of the restoring elastic member 354, the projection 352 of the second stop portion 350 can be pushed to insert into the groove 430 of the connection unit 400 so that the second stop portion 350 can stop the portable electric device 100 returning the open status as mentioned above. On the other hand, when the operation portion 355 is drawn by user, and the projection 352 of the second stop portion 350 is moved with the operation portion 355 to be withdrawn from the groove 430 of the connection unit 400, thus, the restored forces of the first elastic members 540 and the second elastic members 620 will be released, respectively, and the portable electric device 100 can be operated automatically into the open status mentioned above. Meanwhile, the restoring elastic member 354 is deformed to store the restored force again.

Figure 5:
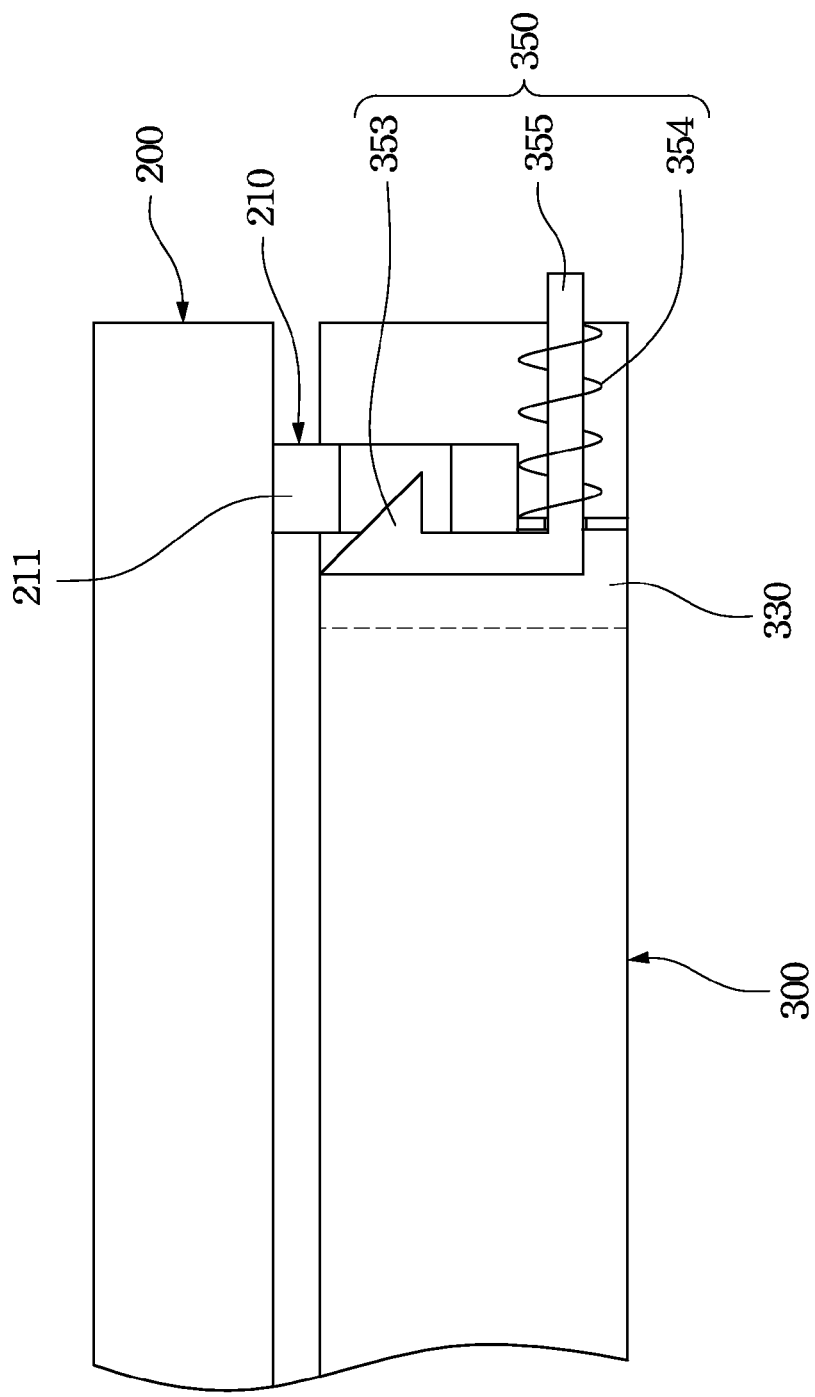
FIG. 5 is an operation view of two stop portions of the portable electric device according to the other embodiment of the present invention.

Refer to FIG. 5 again; FIG. 5 is an operation view of two stop portions 210, the first stop portion 210 and the second stop portion 350 of the portable electric device 100 according to the other embodiment of the present invention.

In another option of the embodiment, the first stop portion 210 disposed on any lateral side of the upper unit 200, for example, can be a rack 211 extending outwards the surface of the upper unit 200. The second stop portion 350 is disposed in a fillister 330, and includes a hook 353, a restoring elastic member 354 and an operation portion 355. The restoring elastic member 354 is connected the fillister 330 at one end thereof, and is connected the hook 353 at the other end thereof so that the hook 353 can be movably disposed in the fillister 330. The operation portion 355 is disposed on one side of the hook 353, and the operation portion 355 is revealed outwards an outer surface of the lower unit 300 for operating by users.

Therefore, when the portable electric device 100 is operated into the closed status as mentioned above, the rack 211 will move into the fillister 330, due to a restored force of the restoring elastic member 354, the hook 353 can be fixed on the rack 211 to limit the movement of the upper unit 200 so as to further stop the portable electric device 100 returning the open status as mentioned above. On the other hand, when the hook 353 is removed apart from the rack 211 by pushing the operation portion 355 by users, because the restored forces of the first elastic members 540 and the second elastic members 620 are released, respectively, the portable electric device 100 can be operated automatically into the open status mentioned above.

Refer to FIG. 1 and FIG. 2A again. In the other option of the embodiment, each of the first pivots 510 includes a damp device 520. When the portable electric device 100 is operated into the open status as mentioned above, the damp device 520 moderates the restored force of the first elastic members 540 for slowing down the rotation speed of the upper unit 200 revolving relative to the connection unit 400 according to the second clockwise direction C2, and preventing damage from the upper unit 200 or the lower unit 300 when the rotation speed of the upper unit 200 is extremely high. Similarly, each of the second pivots 610 includes a damp device 520 for slowing down the rotation speed of the connection unit 400 revolving relative to the lower unit 300 according to the first clockwise direction C1, and preventing damage from the lower unit 300 when the rotation speed of the connection unit 400 is extremely high.

Figure 6A:
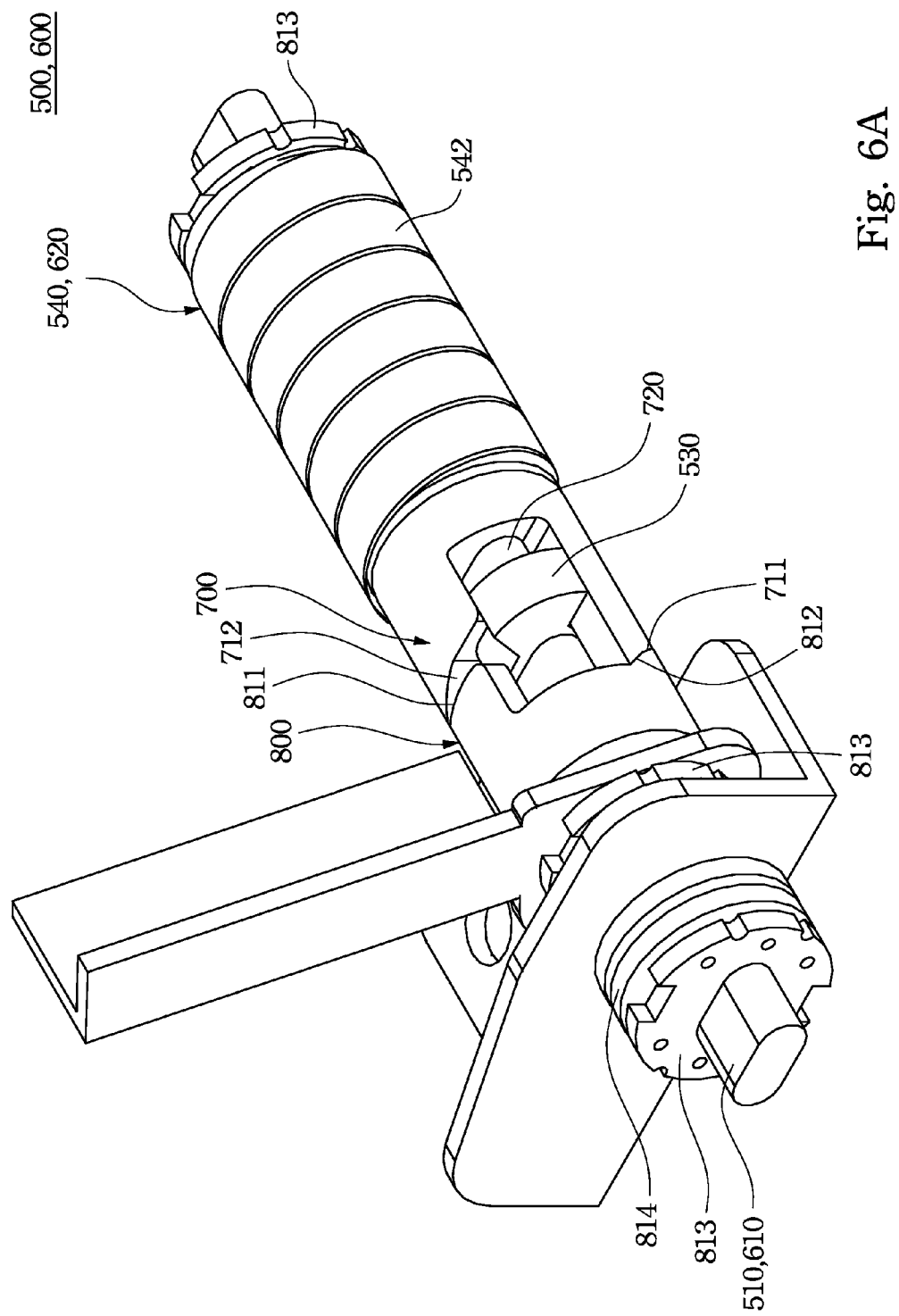
FIG. 6A is a front partial view of pivotal portions and elastic members of the portable electric device according to yet a further embodiment of the present invention.

Refer to FIG. 6A and FIG. 6B in which FIG. 6A is a front partial view of pivotal portions 500, 600 and elastic members 540, 620 of the portable electric device 100 according to yet a further embodiment of the present invention, and FIG. 6B is a back partial view of the pivotal portions 500, 600 and the elastic members 540, 620 of the portable electric device 100 according to the further embodiment of the present invention.

In the further embodiment, each of the first pivotal portions 500 (or the second pivotal portions 600) further includes a first linking cam 700 and a second linking cam 800.

Each of the first elastic members 540 (or the second elastic members 620), for example, can be a retractable spring (or flat wire spring) 542 engaged on a first pivot 510 (or the second pivot 610) in which one end of the retractable spring 542 is fixed by a C-ring 813 on the first pivot 510 (or the second pivot 610), and the other end of the retractable spring 542 coupling to the first linking cam 700. The first linking cam 700 is rotatably set on the first pivot 510 (or the second pivot 610) and can be linked to linearly travel along the first pivot 510 (or the second pivot 610) repeatedly with regarding to the movement of the retractable spring 542. One end of the first linking cam 700 opposite to the retractable spring 542 is provided with a first inclining end face 710.

The second linking cam 800 is rotatably set on the first pivot 510 (or the second pivot 610), and fixedly connected with the connection unit 400 in which one end of the second linking cam 800 is adjacent to the first linking cam 700. One end of the second linking cam 800 oriented to the first linking cam 700 is with a second inclining end face 810 complementarily matched with the first inclining end face 710.

Substantially, the first inclining end face 710 includes a first higher section 711 and a first lower section 712. The second inclining end face 810 includes a second higher section 811 and a second lower section 812.

Thus, when the portable electric device 100 is operated into the open status mentioned above, the first higher section 711 of the first inclining end face 710 of the first linking cam 700 completely contact the second lower section 812 of the second inclining end face 810 of the second linking cam 800, and the first lower section 712 of the first inclining end face 710 of the first linking cam 700 completely contact with the second higher section 811 of the second inclining end face 810 of the second linking cam 800.

Once the portable electric device 100 is operated into the closed status mentioned above, by the revolution of the upper unit 200 (or the lower unit 300), the second linking cam 800 is linked to rotate with the connection unit 400, and the second higher section 811 of the second inclining end face 810 of the second linking cam 800 is moved and changed to completely contact with the first higher section 711 of the first inclining end face 710 of the first linking cam 700, thus, the first linking cam 700 is pushed to squeeze the retractable spring 542 so as to restore a restored force.

On the other hand, when the portable electric device 100 is operated into the open status mentioned above, by releasing the restored force of the retractable spring 542, the retractable spring 542 expands to push the first linking cam 700 to travel linearly towards the second linking cam 800, thus, the first higher section 711 of the first inclining end face 710 of the first linking cam 700 pushes the second higher section 811 of the second inclining end face 810 of the second linking cam 800 so as to rotate the second linking cam 800, thus, the second higher section 811 of the second inclining end face 810 of the second linking cam 800 can be moved to the first lower section 712 of the first inclining end face 710 of the first linking cam 700 along the first inclining end face 710, so as to revolve the upper unit 200 (or connection unit 400) for automatically entering the open status mentioned above.

Also, the first pivot 510 (or the second pivot 610) is further provided with a block 530 thereon, and the first linking cam 700 is further provided with a recess 720 corresponding to the block 530. When the first linking cam 700 is pushed by the retractable spring 542 to travel along the first pivot 510 (or the second pivot 610), the recess 720 of the first linking cam 700 exactly contains the block 530, and is resisted by the block 530 so as to prevent damages happened from the second linking cam 800 when the traveling speed of the upper unit 200 is extremely high.

Further, the first pivot 510 (or the second pivot 610) is further provided with a plurality of damping rings 814 thereon. The damping rings 814 can indirectly push the connection unit 400 (or the upper unit 200) so as to slow down the rotation speed of the connection unit 400 (or the upper unit 200) so as to prevent damages happened from the upper unit 200, the connection unit 400 or the lower unit 300 when the rotation speed thereof is extremely high.

Refer to FIG. 1 and FIG. 2A again. The portable electric device 100, for example, can be a notebook computer, so that the upper unit 200 can be a display screen of the notebook computer, the lower unit 300 can be a mainframe 120 with a physical keyboard 150 of the notebook computer. When the notebook computer is operated into the closed status mentioned above such that the upper unit 200, the connection unit 400 and the lower unit 300 are stacked together in parallel, the display screen 110 covers the mainframe 120 and conceal the physical keyboard 150 so as to present as a tablet PC; otherwise, when the notebook computer is operated into the open status mentioned above, the display screen 110 is automatically risen from the mainframe 120 to reveal the physical keyboard 150 so as to present as a notebook computer.

Refer to FIG. 3 again. The portable electric device 100, for example, can be a combination of a tablet PC and a notebook computer, so that the upper unit 200 can be a tablet PC 140 or a holder 130 for holding the tablet PC 140 (as shown in FIG. 3), the lower unit 300 can be a physical keyboard device 150.

When the portable electric device 100 is operated into the closed status mentioned above such that the tablet PC 140 or the holder 130, the connection unit 400 and the physical keyboard device are stacked together in parallel, the tablet PC 140 or the holder 130 covers the physical keyboard device 150 so as to conceal the physical keyboard device 150; otherwise, when the notebook computer is operated into the open status mentioned above, the tablet PC 140 or the holder 130 is automatically risen from the physical keyboard device 150 to provide the physical keyboard device 150 for use.

To sum up, by releasing the first elastic member and the second elastic member, the portable electric device of the present invention allows the upper unit automatically to rise above the lower unit without operating manually by a user, thus, the present invention not only increases the convenience for using the portable electric device, but also enhances desirability of users for purchasing and utilizing the portable electric device.

Although the present invention has been described with reference to the preferred embodiments thereof, it is apparent to those skilled in the art that a variety of modifications and changes may be made without departing from the scope of the present invention which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A portable electric device, comprising:
   an upper unit;
   a lower unit;
   a connection unit having a first end and a second end opposite with each other;
   a first pivotal portion, comprising:
     a first pivot served for pivoting the upper unit on the first end of the connection unit; and
     a first elastic member disposed on the first pivot; and
   a second pivotal portion, comprising:
     a second pivot served for pivoting the lower unit on the second end of the connection unit; and
     a second elastic member disposed on the second pivot,
   wherein when the upper unit, the connection unit and the lower unit are stacked together in parallel by an external force, the first elastic member and the second elastic member are respectively deformed to store a restored force,
   when the external force is gone, the restored force of the second elastic member rotates the connection unit to be away from the lower unit so as to retain a second included angle between the lower unit and the connection unit, and the restored force of the first elastic member rotates the upper unit to contact with the lower unit so as to retain a first included angle between the upper unit and the connection unit, wherein a third included angle is retained between the upper unit and the lower unit.

2. The portable electric device according to claim 1, wherein the lower unit comprises a trench on a surface thereof, the trench has a length same as a length of a lateral side of the upper unit for leaning against the lateral side of the upper unit.

3. The portable electric device according to claim 1, wherein the upper unit comprises:
    at least one first magnetic member;
    the lower unit comprises:
    at least one second magnetic member pivotally disposed on a surface of the lower unit and corresponding to the first magnetic member,
    wherein when the upper unit is rotated to contact with the lower unit, the second magnetic member is rotated towards the first magnetic member, and attracted with the first magnetic member with each other.

4. The portable electric device according to claim 3, wherein one of the first magnetic member and the second magnetic member is a magnet.

5. The portable electric device according to claim 1, wherein the connection unit comprises a first stop portion having a groove thereon, the lower unit comprises a second stop portion comprising:
    a tenon retractably disposed in the lower unit;
    a restoring elastic member connected the lower unit at one end thereof, connected the tenon at the other end thereof;
    an operation portion disposed on one side of the tenon with one side thereof, wherein the operation portion is revealed outwards an outer surface of the lower unit; and
    a projection connected with the tenon, and served for inserting into the groove.

6. The portable electric device according to claim 1, wherein the connection unit comprises a first stop portion having a rack thereon, the lower unit comprises a fillister and a second stop portion, the second stop portion comprising:
    a hook movably disposed in the fillister;
    a restoring elastic member connected the fillister at one end thereof, connected the hook at the other end thereof; and
    an operation portion disposed on one side of the hook, wherein the operation portion is revealed outwards an outer surface of the lower unit.

7. The portable electric device according to claim 1, wherein the first elastic member is a torsion spring set on the first pivot,
    wherein two ends of the torsion spring are respectively connected the upper unit and the connection unit, and
    the second elastic member is a torsion spring set on the second pivot, wherein two ends of the torsion spring are respectively connected the lower unit and the connection unit.

8. The portable electric device according to claim 7, wherein the first pivot comprises a damp device for slowing down a rotation speed of the upper unit, the second pivot comprises a damp device for slowing down a rotation speed of the lower unit.

9. The portable electric device according to claim 1, wherein the first pivotal portion further comprises:
    a first linking cam rotatably set on the first pivot, served for linearly traveling along the first pivot repeatedly, wherein one end of the first linking cam is connected the first elastic member, and the other end of the first linking cam is with a first inclining end face; and
    a second linking cam rotatably set on the first pivot, wherein one end of the second linking cam being fixedly connected the connection unit, and the other end of the second linking cam being adjacent to the first linking cam, one end of the second linking cam oriented to the first linking cam is with a second inclining end face complementarily matched with the first inclining end face.

10. The portable electric device according to claim 9, wherein the first inclining end face comprise a first higher section and a first lower section, the second inclining end face comprise a second higher section and a second lower section,
    wherein when the upper unit, the connection unit and the lower unit are stacked together in parallel, the second higher section of the second inclining end face of the second linking cam contacts the first lower section of the first inclining end face of the first linking cam.

* * * * *